(12) United States Patent
Odisho et al.

(10) Patent No.: US 6,360,850 B1
(45) Date of Patent: Mar. 26, 2002

(54) PROGRESSIVE BRAKE LINING WEAR SENSOR

(75) Inventors: William Warda Odisho, Kalamazoo, MI (US); James Heydweiller, Rochester, NY (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/620,975

(22) Filed: Jul. 20, 2000

(51) Int. Cl.[7] ............................................... F16D 66/00
(52) U.S. Cl. .................... 188/1.11 L; 188/214; 340/454
(58) Field of Search ....................... 188/1.11 L, 1.11 W, 188/1.11 E, 214; 340/453, 454; 361/737, 738; 174/52.2

(56) References Cited

U.S. PATENT DOCUMENTS

| | | | |
|---|---|---|---|
| 3,958,445 A | * 5/1976 | Howard et al. | 188/1.11 L X |
| 4,646,001 A | 2/1987 | Baldwin et al. | |
| 4,824,260 A | 4/1989 | Novotny et al. | |
| 5,015,990 A | * 5/1991 | Reede | 340/454 |
| 5,302,940 A | * 4/1994 | Chen | 340/454 |
| 5,419,415 A | * 5/1995 | Lamb et al. | 188/1.11 L |
| 5,559,286 A | * 9/1996 | White et al. | 340/454 X |
| 5,617,297 A | * 4/1997 | Lo et al. | 174/52.2 X |
| 5,637,794 A | 6/1997 | Hanisko | |
| 5,677,511 A | * 10/1997 | Taylor et al. | 174/52.2 |

FOREIGN PATENT DOCUMENTS

| | | |
|---|---|---|
| DE | 4312354 C1 * | 6/1994 |
| EP | 545063 A1 * | 10/1992 |

* cited by examiner

Primary Examiner—Douglas C. Butler
Assistant Examiner—Melanie Torres
(74) Attorney, Agent, or Firm—Liniak, Berenato, Longacre & White

(57) ABSTRACT

A progressive brake lining wear and temperature sensor having a plurality of parallel arranged spaced apart resistors in connection with a sensing circuit. Each resistor is mounted onto a PC board which in turn is encapsulated within a single molding. A thermistor is also mounted onto the PC board within the molding to sense lining temperature. The thermistor is connected to a ground lead. The ground lead, resistance lead and thermistor lead emerge from the encapsulated sensor for connection to the sensing circuit. The sensor is disposed within the brake lining and is connected to the brake shoe by a securement clip. As the brake lining progressively wears, the resistors are progressively worn away thus changing the overall resistance of the sensor. The change in resistance indicates state of wear. Preferably, three resistors are employed to indicate four degrees of brake lining wear.

11 Claims, 4 Drawing Sheets

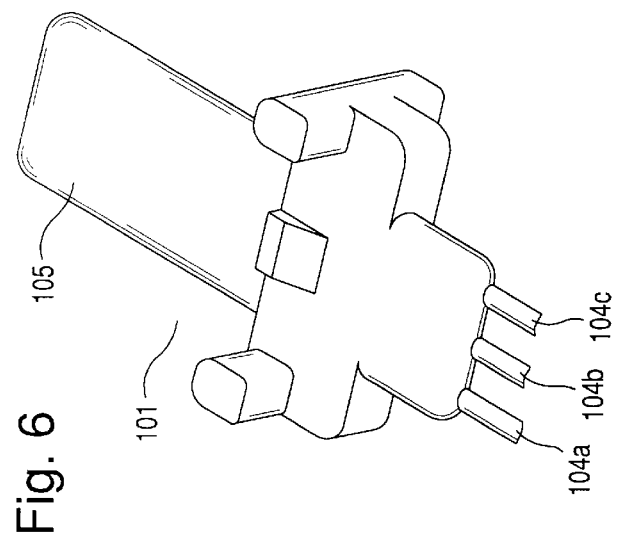
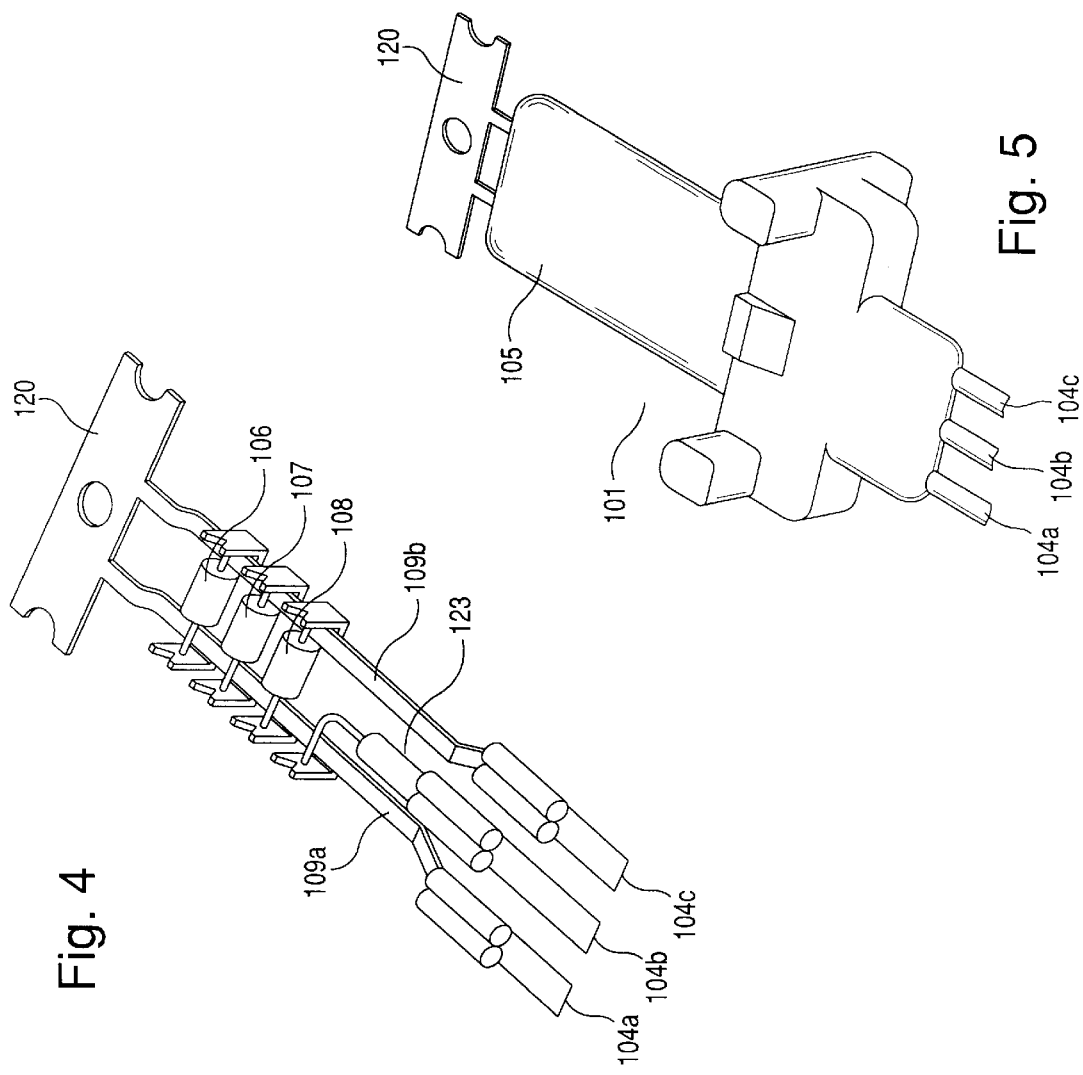

PROGRESSIVE BRAKE LINING WEAR SENSOR

BACKGROUND OF THE INVENTION

1. Field of the Invention

The present invention is directed to a brake lining wear sensor and is more particularly directed to a modular progressive brake lining wear and temperature sensor.

2. Summary of the Prior Art

Various brake lining wear detection systems are known in the art. In addition, temperature measurement systems are known. However, few brake lining monitoring systems combine both wear detection and temperature sensing. One such temperature and wear detection technique monitors the resistance of a temperature sensitive resistor yielding a signal which represents the operating temperature of the brake lining so that extreme temperature conditions can be detected and corrective action taken. Once the electrical conductive loop is worn away, an open circuit is detected which signals the need for lining replacement.

One method to detect brake lining employs an embedded conductive wire loop within the brake lining. When the loop is broken and furthermore, when electrical contact is made between the wire loop and a brake drum surface, lining wear out is detected. Another brake wear and temperature measurement system utilizes a plurality of thermo-responsive elements disposed within the brake lining where each element is selectively monitored to determine if abnormal temperatures have been encountered and/or whether the brake lining has worn to such an extent that one or more of the thermally responsive elements have been broken.

A more traditional brake temperature indication means comprises a thermocouple disposed within the brake lining connected to a display means to indicate operating temperature of the brake lining. A similar technique uses a combination temperature and wear sensor disposed in a brake cylinder where the sensor has a slider mechanism that is pressed on the face of a brake cylinder to indicate brake wear and also includes a temperature sensing device thereby indicating the wear of the brake lining and overheating of the brake fluid through a pair of lead out wires.

It is an object of the present invention to provide a dual temperature and progressive break wear sensor in a single compact erodable element.

SUMMARY OF THE INVENTION

The present invention is directed to a modular progressive brake lining wear and temperature sensor. The sensor has a plurality of parallel-arranged spaced apart resistors in connection with a sensing circuit. Each resistor mounted onto a PC board which is encapsulated within a single molding. A thermistor is also mounted on the PC board within the molding to sense temperature. The thermistor is connected to a grounded lead as are each of the spaced apart resistors. The ground lead, a resistance lead and a thermistor lead emerge from the encapsulated sensor for connection to a sensing circuit. The sensor is disposed within the brake lining. As the brake lining progressively wears, the resistors are progressively worn away thus changing the overall resistance of the sensor. The change in resistance indicates state of wear. Preferably three resistors are employed to indicate four degrees of brake lining wear. The thermistor indicates brake lining temperature and may be used to balance vehicle brakes.

BRIEF DESCRIPTION OF THE DRAWINGS

FIG. 4 is a perspective-exposed view of the brake sensor according to an alternate embodiment of the present invention.

FIG. 5 is a perspective view of the brake sensor of FIG. 3 encapsulated in a thermoset.

FIG. 6 is a perspective view of the brake sensor of FIG. 5 without the production tab.

DESCRIPTION OF THE PREFERRED EMBODIMENT

Figure 1:
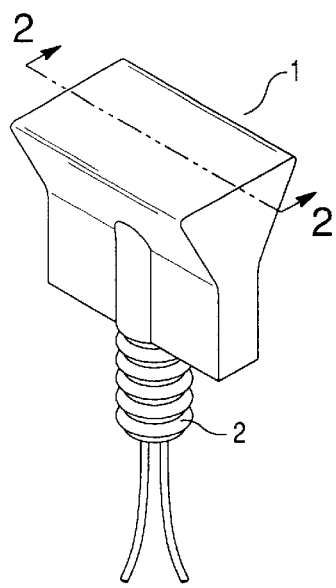
FIG. 1 is a perspective view of a brake lining sensor according to the present invention.
Figure 2:
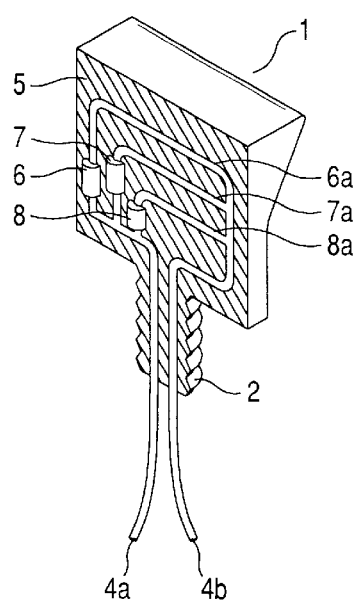
FIG. 2 is a sectional perspective view taken along line 2—2 of FIG. 1.
Figure 3:
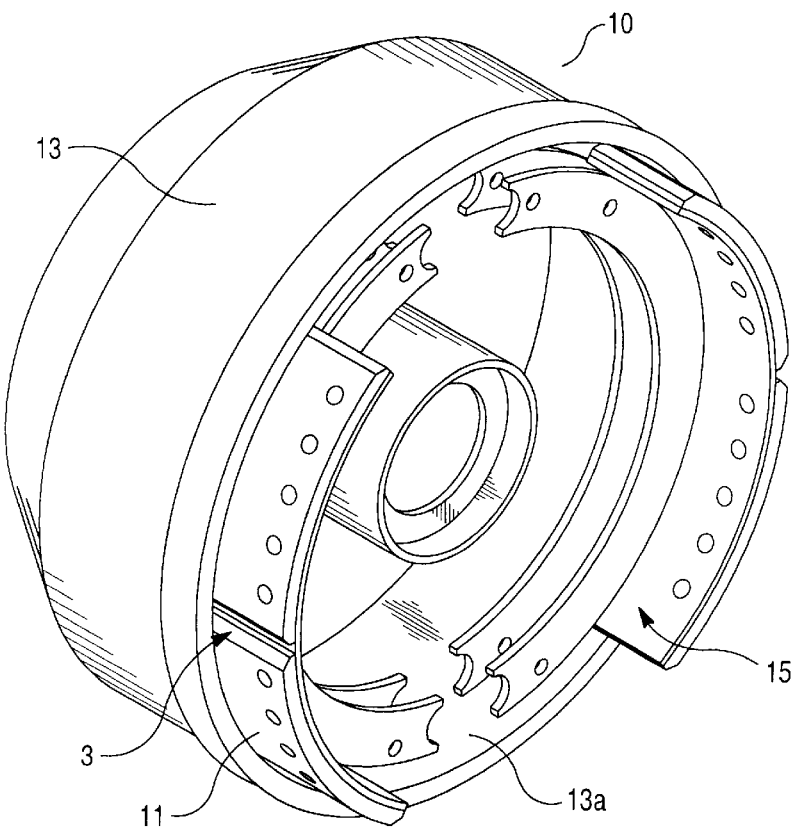
FIG. 3 is a perspective view of a drum brake assembly incorporating the brake sensor of the present invention.

FIG. 1 depicts a modular encapsulated brake wear sensor 1. The modular unit 1 is preferably disposed between adjacent portions of a drum brake lining 11 as shown in FIG. 3 as indicated by arrow 3. FIG. 2 is a sectional view taken along lines 2—2 of FIG. 1. A plurality of resistors 6, 7, 8 are arranged in parallel and connected to a pair of leads 4a, 4b emerging from the sensor 1. The modular sensor 1 is formed of molded thermoset 5 and the resistors 6, 7, 8 and leads 4a, 4b are embedded therein. As the brake lining 11 wears, each loop 6a, 7a, 8a associated with a corresponding resistor 6, 7, 8 is worn away and the electrical connection with the wire leads 4a, 4b broken. Consequently, the overall resistance of the sensor 1 changes. The change in resistance is detected by a sensing circuit (not shown) to determine and indicate present state of wear. One of ordinary skill in the art is capable of programming a sensing circuit to detect the change in resistance as taught by the present invention and further elaboration of the sensing circuit is not warranted.

When the brake lining 11 is new, or before the first loop 6a, is worn, the initial resistance will indicate minimal or no wear. After the first loop 6a is worn, the resistance will increase significantly indicating slight wear. As the second loop 7a is worn and the second resistor 7 is disconnected from the sensing circuit, the resistance will again significantly increase indicating moderate wear. Lastly as the third and last loop 8 is worn and the third resistor 8 removed from the sensing circuit, the resistance increases exponentially indicating an open circuit and severe wear at which time the brake lining 11 should be replaced. However, the arrangement may also be employed to detect three levels of wear, where the last resistor 8 is not worn and when isolated by the wear of the first two resistors 6, 7 indicates severe wear and time to replace the brake lining 11.

The present invention is preferably employed in a drum brake assembly 10 as shown in FIG. 3. However, the modular sensor 1 may also be employed in other brake assemblies. Referring now to FIG. 3, a brake drum 13 has an internal brake surface 13a for frictionally engaging the brake lining 11. An actuator such as an S-cam arrangement displaces the brake shoes 15 towards the brake surface 13a. Brake linings 11 are mounted to the brake shoe 15 to frictionally engage the brake drum 13 and thus provide a braking force. The generic brake drum arrangement 10 and actuation is well known in the art.

The modular sensor 1 is preferably mounted between a pair of brake lining surfaces 11 (as generally shown by arrow 3) with a terminal end adjacent or substantially flush with the outer surface of the brake lining 11. The specific connection to the brake shoe 15 is not shown. However the specific connection is not critical to the present invention. Any suitable connection that maintains radial alignment of the sensor 1 during braking may be employed. In the first embodiment, the sensor 1 has barbs 2 to engage a bore in the brake shoe or a clip separately secured to the brake shoe 15. Other types of connections of are contemplated by the present invention.

The resistors 6, 7, 8, are strategically spaced apart to coincide with different levels of the brake lining 11. Therefore, as the loops 6a, 7a, 8a are worn away, the resistance change will indicate predetermined levels or wear.

FIGS. 4–6 represents an alternate embodiment of the present invention. Referring to FIG. 4, a pair of parallel rails 109a, 109b are connected by a production tab 120 at one end and are connected to sensing circuits leads 104a, 104b, 104c at the opposite end. The rails are crimped to the sensing leads 104a, 104c. A first rail 109a is connected to a ground lead 104a of the sensing circuit while the other rail 109b is connected to a resistance lead 104c. A plurality of resistors 106, 107, 108 are connected across the rails 109a, 109b to establish an electrical connection there between. These resistors 106, 107, 108 are preferably crimped to the rails 109a, 109b rather than being soldered to maintain a secure connection when exposed to high temperatures. A thermistor 123 is also connected to the grounded rail 109a and has a separate lead 104b for connection to the sensing circuit. The rails 109a, 109b, resistors 106, 107, 108, thermistor 123 and lead connections 104a, 104b, 104c are all encapsulated in a thermoset molding 105 to define a modular sensor unit 101. The production tab 120 facilitates positioning of the assembly 101 during molding. However, the tab 120 is broken off prior to installation in the brake assembly 10. FIG. 6 depicts the molded modular unit 101 without the production tab 120.

The modular unit 101 is disposed within the brake lining 11 similar to the previous embodiment. Here again, the modular sensor 101 is preferably installed between portions of the brake lining 11 in a drum brake assembly 10 as shown in FIG. 3, but may also be disposed within a single brake lining portion. The modular sensor 101 is oriented so that the rails 109a, 109b extend from the actuator toward the brake drum surface 13a with the leads 104a, 104b, 104c emerging radially inward for connection to the sensing circuit (not shown). The modular sensor 101 may fit into a clip separately attached to the brake shoe 15 or may be otherwise secured thereto. As in the previous embodiment, the resistors 106, 107, 108 are strategically spaced apart to coincide with different levels of the brake lining 11. As the brake lining 11 wears, each of the resistors 106, 107 is worn away from the sensor and the overall resistance of the sensor 101 changes. The circuit simply senses this resistance change and determines the state of wear dependent thereon. Preferably three resistors 106, 107, 108 are employed all arranged in parallel within the modular sensor unit 101.

As previously mentioned, the sensing leads 104a, 105c are crimped to the rails and temperature lead 104b crimped to the thermistor 123 in any suitable fashion. However, the rails 109a, 109b are formed with slots to receive a wire portion of each of the resistors 106, 107, 108 and thermistor 109 and the wires crimped thereto. Again, forming the connections by crimping maintains a superior connection during elevated temperatures over conventional solder connections.

The specific components of the preferred sensor will now be disclosed. A first outermost resistor 106 is a 1 KΩ resistor. The second intermediate resistor 107, is 4.7 KΩ and the inner most resistor 108 22 KΩ. This arrangement yields a progressive overall sensor resistance of an initial resistance of 795 Ω, intermediate resistance of 3.87 KΩ and a final resistance of 22 KΩ. As can be seen the overall resistance of the sensor 101 progressively increases as the resistors 106, 107 are worn away. The three resistance levels indicate at least three levels of wear in accordance with the strategic locations of the resistors 106, 107. Before the first resistor 106 is worn away, the low resistance indicates little or no wear. When the overall resistance first increases when the first resistor 106 is worn away, an intermediate wear level is sensed. Finally, when the second intermediate resistor 107 is worn away, the final resistance of 22 KΩ indicates severe wear and time to replace the brake lining 11. Off course should the third resistor 108 wear away; the overall resistance will increase to indicate an open circuit. Therefore, the sensor 10 could be strategically placed to indicate four distinct wear levels.

The resistors 106, 107, 108 employed may be leaded general purposes resistors provided by Speer Electronics. The thermistor 123 employed in the preferred embodiment may be a type DK negative temperature coefficient thermistor which can measure temperatures up to 698° F., provided by NTC Thermistors. However, the present invention is not limited to the application of these specific resistors or thermistors.

Figure 7:
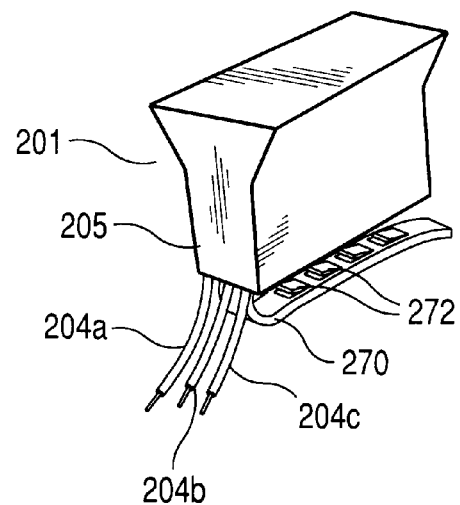
FIG. 7 is a perspective view of the brake sensor according to the preferred embodiment of the present invention.

FIG. 7 is a perspective view of the preferred embodiment of the present invention. In this embodiment the sensor 201 has a securement clip 270 partially embedded within the molding 205. The securement clip 270 preferably has a plurality of tabs 272 form of bent portions of the clip to provide a snug snap fit connection to the brake shoe. As in the previous embodiment a plurality of spaced apart resistors and a thermistor are embedded within the molding 205 and connected to leads 204a, 204b, and 204c which are in turn connected to a sensing circuit.

Figure 8:
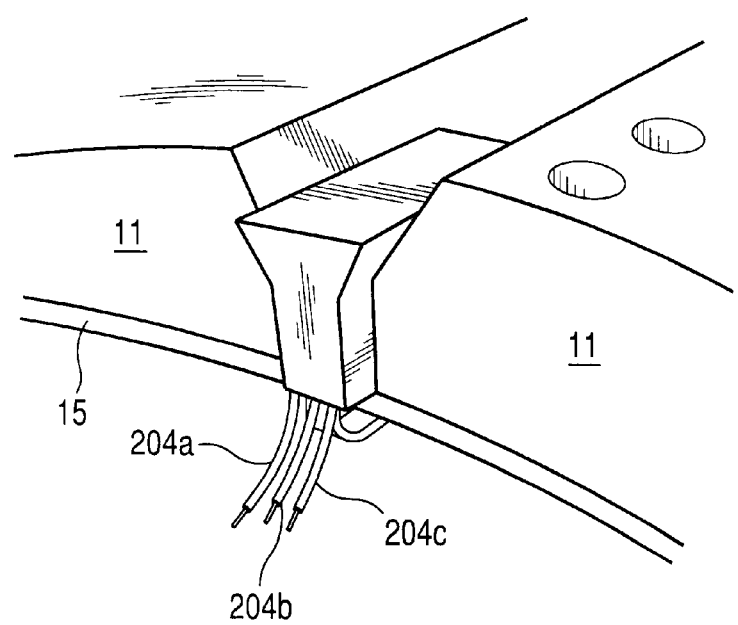
FIG. 8 is a perspective view of the sensor of FIG. 7 attached to a brake assembly.

FIG. 8 is a perspective view of the brake sensor 201 of FIG. 7 connected to the brake assembly 10 of FIG. 3 in the vicinity of arrow 3. As can be seen in FIG. 8, the sensor 201 is simply slip onto the brake shoe 15 between the brake lining portions 11. The securement clip 270 simply slides over the brake shoe 15 and the tabs 272 maintain a secure connection. The sensor molding 205 is substantially Y-shaped conforming to the profile of the brake lining. The Y-shape and securement clip 270 facilitate longitudinal assembly of the brake sensor 201 within the brake assembly. Such an arrangement is superior to the radial assembly of the prior art sensors thus enabling easy assembly both prior to and after the brake shoe 15 is installed within the brake drum 13. In this preferred embodiment the resistors and thermistor are arranged on a PC board which in turn is molded in a temperature resistant thermoset similar to the following embodiment of FIGS. 9–10 which will later be explained.

Figure 9:
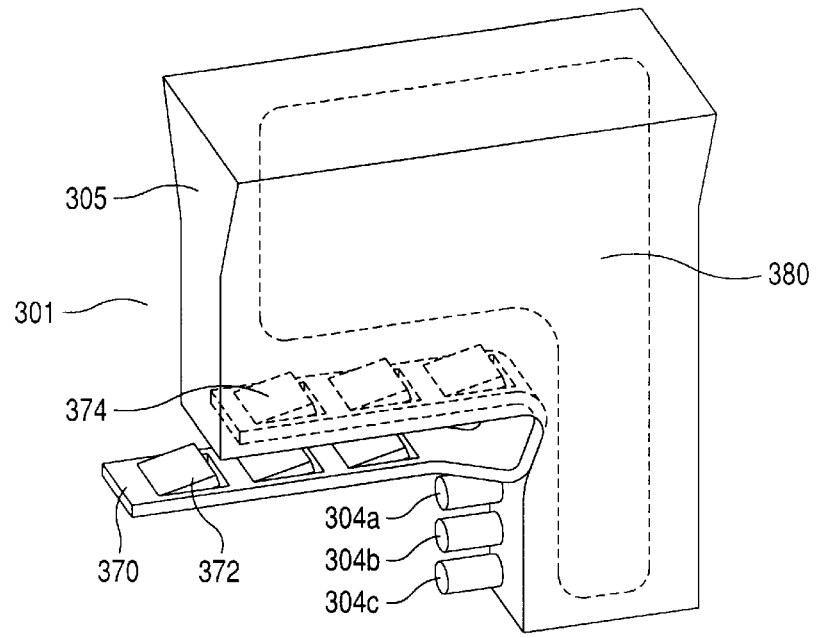
FIG. 9 is a perspective view of an alternate preferred embodiment of the present invention.

FIG. 9 is alternate preferred embodiment of the present invention. Sensor 301 is comprised of a molding 305 with a securement clip 370 partially embedded therein similar to the previous embodiment of FIGS. 7–8. As in the previous embodiment a plurality of tabs 372, 374 facilitate a snug snap fit connection to the brake shoe 15. Leads 304a, 304b, and 304c emerge from the sensor for connection to a sensing circuit as in each of the previous embodiments. A PC board 380 is embedded within the molding 305 to which are mounted the sensor components.

Figure 10:
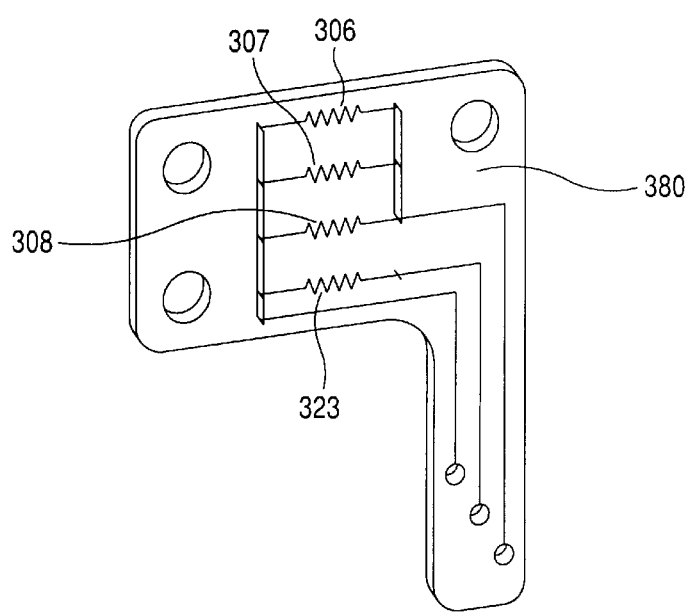
FIG. 10 is an isolated view of the PC board embedded in the sensor of FIG. 9.

FIG. 10 is an exposed view of the PC board 380 of FIG. 9. A plurality of spaced apart parallel arranged resistors 306,

307 and 308 are each mounted to the PC board 380. A conductive trace connects each of the resistors 306, 307, 308 and thermistor 323 to a common ground lead 304a. The opposite end of the thermistor 323 is separately connected to the lead 304b by a conductive trace. Lastly, the opposite ends of each resistor 306, 307, 308 are connected to a resistor lead 304c for sensing the resistance across to ground of the sensor 301. Each of the resistors, thermistor, PC board and thermoset molding can survive high brake applications of 600° F.

The operation of the present embodiment is identical to the previous embodiments. As the sensor 301 wears and the resistors worn from the circuits, the change in overall resistance progressively indicates the current state of wear. The thermistor 323 indicates the temperature of the brake lining. The specific connections of the leads 304a, 304b, 304c to the sensing circuit and the PC board are not shown in detail but are readily apparent to one of ordinary skill in the art.

While the foregoing invention has been shown and described with reference to a preferred embodiment, it will be understood by those possessing skill in the art that various changes and modifications may be made without departing from the spirit and scope of the invention. For example, the present invention is not limited to the specific type of resistors disclosed. In the embodiment of FIGS. 7–10 a first outermost resistor 306 may be a 5 KΩ resistor. The second intermediate resistor 307, 15 KΩ and the inner most resistor 308 30 KΩ. The thermistor 323 may have a resistance value of 100 KΩ at 72° F. Other values may also be employed so long as the change in overall resistance is easily detected as each resistor is worn. Furthermore, while a thermoset has been disclosed as the molding, a thermoplastic may also be employed.

What is claimed is:

1. A brake lining wear sensor for indicating progressive brake wear in a brake lining disposed between a brake surface and a brake actuator, said sensor comprising:
   an encapsulated erodable element substantially disposed within said brake lining, said erodable element including;
      two substantially straight parallel rails extending in a first direction extending from said brake actuator to said brake surface;
      a plurality of resistors arranged in parallel and spaced apart in a direction between said brake actuator and said brake surface, said plurality of resistors being disposed between and connected to said parallel rails and spaced apart in said first direction;
   said two substantially straight parallel rails being connected to a sensing circuit for detecting progressive wear of said brake lining, wherein as said brake lining progressively wears said plurality of resistors progressively erode and progressively disconnect continuity of said plurality of resistors between said parallel rails thereby progressively changing an overall resistance between said parallel rails to thereby indicate progressive brake lining wear in said sensing circuit.

2. The brake lining wear sensor according to claim 1, wherein said plurality of resistors comprises at least three resistors to facilitate sensing of at least three levels of wear of said brake lining.

3. The brake lining wear sensor according to claim 1, wherein said plurality of resistors are encapsulated in a thermoset molding to form a modular unit.

4. The brake lining wear sensor according to claim 3, further comprising:
   a thermistor embedded in said thermoset molding to sense a temperature of said brake lining.

5. A brake lining wear sensor for indicating wear in a brake lining disposed between a brake surface and a brake actuator, said modular sensor comprising:
   an encapsulated erodable element substantially disposed within said brake lining, said erodable element including;
      a plurality of arranged resistors embedded within said erodable element and spaced apart a first direction extending from said brake actuator to said brake surface;
      wherein said resistors are connected in parallel and together are connected to a sensing circuit so that as said brake lining wears said erodable element progressively erodes to progressively disconnect continuity of said plurality of resistors and thereby progressively change an overall resistance of said sensor and thereby indicate progressive brake lining wear in said sensing circuit;
   wherein said encapsulated erodable element further includes;
   two substantially parallel rails embedded therein and extending in said first direction, said resistors being disposed between and connected to said parallel rails;
   wherein said two substantially parallel rails are connected to said sensing circuit so that as said brake lining wears said erodable element progressively erodes to progressively disconnect continuity of said plurality of resistors between said parallel rails thereby progressively changing an overall resistance between said parallel rails to thereby indicate progressive brake lining wear in said sensing circuit.

6. The modular brake lining wear sensor according to claim 5, further comprising:
   a thermistor embedded in said encapsulated erodable element provided to sense a temperature of said brake lining.

7. The modular brake lining wear sensor according to claim 5, wherein said encapsulated erodable element is formed of a thermoset molding.

8. The modular brake lining wear sensor according to claim 5, wherein said plurality of resistors comprises at least three resistors to facilitate sensing of at least three levels of wear of said lining.

9. The modular brake wear sensor according to claim 5, wherein said resistors are crimped to said rails to form an electrical connection there between.

10. The modular brake wear sensor according to claim 5, said plurality of resistors comprises at least three resistors to facilitate sensing of at least four levels of wear of said lining.

11. The brake lining wear sensor according to claim 5, wherein said encapsulated erodable element is substantially Y-shaped when view in cross section.

* * * * *